(12) United States Patent
Joo

(10) Patent No.: US 12,511,946 B2
(45) Date of Patent: Dec. 30, 2025

(54) VEHICLE DISTANCE TO EMPTY PREDICTION APPARATUS AND METHOD

(71) Applicants: HYUNDAI MOTOR COMPANY, Seoul (KR); Kia Corporation, Seoul (KR)

(72) Inventor: Ki Hyung Joo, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 164 days.

(21) Appl. No.: 18/219,856

(22) Filed: Jul. 10, 2023

(65) Prior Publication Data
US 2024/0185643 A1    Jun. 6, 2024

(30) Foreign Application Priority Data
Dec. 6, 2022 (KR) .................. 10-2022-0168983

(51) Int. Cl.
*G06N 7/01*  (2023.01)
*G07C 5/00*  (2006.01)

(52) U.S. Cl.
CPC .............. *G07C 5/004* (2013.01); *G06N 7/01* (2023.01)

(58) Field of Classification Search
CPC .......... G07C 5/004; G06N 7/01; G06N 20/00; B60L 3/12; B60L 58/12
See application file for complete search history.

(56) References Cited

U.S. PATENT DOCUMENTS

| | | | | |
|---|---|---|---|---|
| 2013/0073113 A1* | 3/2013 | Wang | ...................... | B60W 20/11 701/1 |
| 2015/0239455 A1* | 8/2015 | Qiu | ................... | B60W 50/0097 701/22 |
| 2016/0061610 A1* | 3/2016 | Meyer | ..................... | B60L 58/12 701/22 |
| 2016/0137090 A1* | 5/2016 | Nam | ....................... | B60L 58/12 701/22 |
| 2024/0086811 A1* | 3/2024 | Kumar | ............. | G06Q 10/06316 |

OTHER PUBLICATIONS

Kihyung Ju, "Predictive modeling personalization of distance to empty (DTE) of AI-based electric vehicle", The 30th Hyundai Motor Company Group Conference, Sep. 26, 2022.

* cited by examiner

*Primary Examiner* — Ashley L Redhead, Jr.
(74) *Attorney, Agent, or Firm* — MORGAN, LEWIS & BOCKIUS LLP

(57) ABSTRACT

A vehicle distance to empty (DTE) prediction apparatus and a method therefor include a processor configured to define a DTE prediction model of a vehicle based on a linear regression model reflecting a Bayesian probability distribution, and to predict a DTE by learning the DTE prediction model based on driving data of the vehicle; and a storage configured to store data and algorithms driven by the processor.

20 Claims, 17 Drawing Sheets

| | Current vehicle speed | Change rate of current vehicle speed | Change rate of current pedal | Change rate of current SOC | Vehicle speed after 1 min. | Change rate of vehicle speed after 1 min. | Change rate of pedal after 1 min. | Change rate of SOC after 1 min. |
|---|---|---|---|---|---|---|---|---|
| 1 | 80 | 30 | 10 | 0.04 | 75 | 10 | 2 | 0.01 |
| 2 | 90 | 20 | 8 | 0.03 | 100 | 20 | 5 | 0.02 |
| 3... | ... | ... | ... | ... | ... | ... | ... | ... |

FIG. 10

VEHICLE DISTANCE TO EMPTY PREDICTION APPARATUS AND METHOD

CROSS-REFERENCE TO RELATED APPLICATION

The present application claims priority to Korean Patent Application No. 10-2022-0168983, filed on Dec. 6, 2022, the entire contents of which is incorporated herein for all purposes by this reference.

BACKGROUND OF THE PRESENT DISCLOSURE

Field of the Present Disclosure

The present disclosure relates to a vehicle distance to empty (DTE) prediction apparatus and a method therefor, and more particularly, to a technique for predicting a DTE of a vehicle based on a personalized driving pattern.

Description of Related Art

In general, an internal combustion engine vehicle predicts a distance to empty (DTE) from a current fuel level and displays it to a driver.

Because electric vehicles are more sensitive to the DTE, it is very important accurately inform the DTE according to remaining capacity of a high voltage battery in real time while driving. Accordingly, conventional electric vehicles estimate a driving distance to provide it to the driver by use of a relationship between a state of charge (SOC) value of the high voltage battery and an energy consumption rate per vehicle distance, However, conventionally, in analyzing customer driving data, there is a problem in that a difference occurs between a DTE model predicting value and an actual mileage in the case of a driving DTE. Furthermore, conventionally, the DTE is calculated using a past driving efficiency learning value, but because an average value of driving characteristics of 20 arrays is used, it is difficult to reflect various driving patterns, and there is a problem in that it is difficult to reflect changes in driving conditions such as changes in battery stage of health (SOH) and vehicle driving friction (changes in tire rolling resistance, changes in friction between accessories, etc.).

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle distance to empty (DTE) prediction apparatus and a method therefor, configured for predicting the DTE based on a linear regression model that reflects a Bayesian probability distribution based on machine learning.

Another exemplary embodiment of the present disclosure has been made in an effort to provide a DTE prediction apparatus and a method therefor, configured for preventing performance deterioration due to driving by updating a linear regression model by learning the linear regression model, optimized by learning it with initial data, by use of new driving data, improving prediction accuracy of the DTE.

Another exemplary embodiment of the present disclosure has been made in an effort to provide a DTE prediction apparatus and a method therefor, configured for improving DTE prediction performance by generating a clustering model through personalization of a driving pattern and by correcting a DTE using driving pattern data of a same cluster as a current driving time.

The technical objects of the present disclosure are not limited to the objects mentioned above, and other technical objects not mentioned may be clearly understood by those skilled in the art from the description of the claims.

An exemplary embodiment of the present disclosure provides a DTE prediction apparatus including: a processor configured to define a DTE prediction model of a vehicle based on a linear regression model reflecting a Bayesian probability distribution, and to predict a DTE by learning the DTE prediction model based on driving data of the vehicle; and a storage configured to store data and algorithms driven by the processor.

In an exemplary embodiment of the present disclosure, the processor may be configured to define the linear regression model reflecting the initial Bayesian probability distribution as a prior probability model, to generate a posterior probability model based on additionally collected driving data of the vehicle and the prior probability model, to update the posterior probability model with the linear regression model reflecting the initial Bayesian probability distribution, and to predict the DTE using a linear regression model reflecting the updated Bayesian probability distribution.

In an exemplary embodiment of the present disclosure, the processor may be configured to define a basic linear regression model including linear correlation between a dependent variable and at least one independent variable, and
to define the linear regression model reflecting the Bayesian probability distribution based on the basic linear regression model.

In an exemplary embodiment of the present disclosure, the processor may be configured to define a prior probability of a coefficient value of the linear regression model, a probability of an observation in a response that the coefficient value of the linear regression model is given, and a posterior probability derived based on observed data regardless of the coefficient value of the linear regression model.

In an exemplary embodiment of the present disclosure, the independent variables of the linear regression model may include at least one of index (one step index (t)), SOC (stage of charge) consumption, mileage so far, vehicle acceleration, an SOC change rate, a vehicle speed, a steering wheel rotation angle, a rotation speed, a distance from a vehicle in front, a brake depth, a vehicle yawing parameter, vehicle longitudinal acceleration, vehicle lateral acceleration, or a combination thereof.

In an exemplary embodiment of the present disclosure, the processor may be configured to determine whether re-learning of the DTE prediction model is required based on a difference between a prediction value of the DTE prediction model and an actual driving distance.

In an exemplary embodiment of the present disclosure, the processor may be configured, if the re-learning is required, to collect driving data for a predetermined driving period, and to learn the DTE prediction model using the collected driving data.

In an exemplary embodiment of the present disclosure, the processor may be configured to verify performance of the learned DTE prediction model based on a predetermined evaluation index.

In an exemplary embodiment of the present disclosure, the processor may be configured to predict the DTE using a DTE prediction model including good performance as a result of the verification.

In an exemplary embodiment of the present disclosure, the processor may be configured to classify and generate a cluster group for each driving pattern by use of data for each driving pattern stored for a predetermined number of driving count.

In an exemplary embodiment of the present disclosure, the data for each driving pattern may include at least one of a driving time, a driving start time, a starting position, a driving distance, a driving path, or a combination thereof.

In an exemplary embodiment of the present disclosure, the processor may be configured to store driving history for a predetermined driving period as summary data, and to vectorize a driving start time.

In an exemplary embodiment of the present disclosure, the processor may be configured to generate clusters based on density and a minimum number of vectorized points, and to generate a cluster group using a density-based unsupervised clustering model.

In an exemplary embodiment of the present disclosure, the processor may be configured the density-based unsupervised clustering model includes density-based spatial clustering of application with noise (DBSCAN).

In an exemplary embodiment of the present disclosure, the processor may be configured to generate a plurality of cluster groups by clustering driving time information and driving patterns including a closest distance to a median number of driving distances.

In an exemplary embodiment of the present disclosure, the processor may be configured to select a median number of each of the cluster groups as a center point, and to select a cluster group including a center point of a closest distance to a current driving feature vector of the vehicle among the center points of the respective cluster groups.

In an exemplary embodiment of the present disclosure, the processor may be configured to read a driving pattern and driving information of the selected cluster group from the storage, and to correct the DTE predicted by the DTE prediction model by use of the driving pattern and the driving information of the selected cluster group.

In an exemplary embodiment of the present disclosure, the processor may be configured to select a cluster group including a high cosine similarity between a current driving feature vector of the vehicle and the driving time and day data from among the cluster groups, and to correct the DTE predicted by the DTE prediction model using the driving pattern and the driving information of the selected cluster group.

In an exemplary embodiment of the present disclosure, the processor may be configured to determine and correct the DTE based on driving information including each road type section of a driving trajectory, a speed for each section, a pedal value for each section, a brake value for each section, an SOC value and a mileage, and a remaining SOC value, and to correct the determined DTE using the driving pattern and the driving information of the selected cluster group.

An exemplary embodiment of the present disclosure provides a DTE prediction method including: defining, by a processor, a distance to empty (DTE) prediction model of a vehicle based on a linear regression model reflecting a Bayesian probability distribution; learning, by the processor, the DTE prediction model based on driving data of the vehicle; and predicting, by the processor, the DTE.

According to the present technique, it is possible to predict the DTE based on a linear regression model that reflects a Bayesian probability distribution based on machine learning.

Furthermore, according to the present technique, it is possible to prevent performance deterioration due to driving by updating a linear regression model by learning the linear regression model, optimized by learning it with initial data, by use of new driving data, improving prediction accuracy of the DTE.

It is also possible to improve DTE prediction performance by generating a clustering model through personalization of a driving pattern and by correcting a DTE using driving pattern data of same clustering as a current driving time.

Furthermore, various effects which may be directly or indirectly identified through the present specification may be provided.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 10 illustrates an example table for describing a process of correcting a DTE based on a DTE prediction model.

Figure 1:
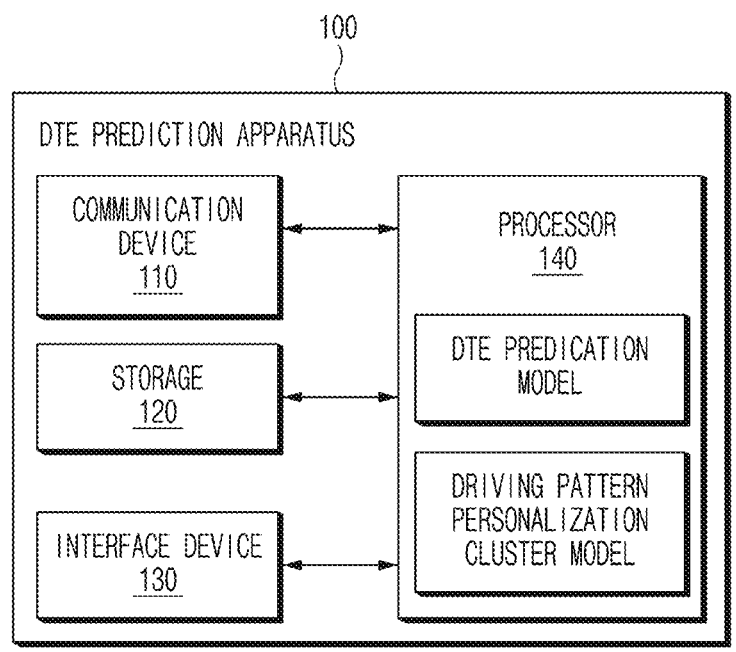
FIG. 1 illustrates a block diagram showing a configuration of an example distance to empty (DTE) prediction apparatus.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms include the same meanings as those which are generally understood by those skilled in the technical field of the present disclosure to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 1 to FIG. 15.

FIG. 1 illustrates a block diagram showing a configuration of an example distance to empty (DTE) prediction apparatus.

The DTE prediction apparatus 100 according to an exemplary embodiment of the present disclosure may be implemented inside or outside the vehicle. In the instant case, the mileage management apparatus 100 may be integrally formed with internal control units of the vehicle, or may be implemented as a separate hardware device to be connected to control units of the vehicle by a connection means. For example, the DTE prediction apparatus 100 may be implemented integrally with the vehicle, may be implemented in a form which is provided or attached to the vehicle as a configuration separate from the vehicle, or a part thereof may be implemented integrally with the vehicle, and another part may be implemented in a form which is provided or attached to the vehicle as a configuration separate from the vehicle.

The DTE prediction apparatus 100 may be configured to predict a distance to empty (DTE) of an electric vehicle based on a current level of a battery from a driving start point and a remaining battery amount reflecting a driving pattern.

The DTE prediction apparatus 100 may be configured to predict the DTE by use of a linear regression model based on a Bayesian probability distribution. The DTE prediction apparatus 100 may input initial data as parameters of the initial linear regression model and learn it so that performance of the linear regression model may be optimized. The linear regression model may be updated if accuracy of a DTE prediction value by the linear regression model is lower than a predetermined reference value, by monitoring whether performance of the linear regression model deteriorates due to future vehicle driving, battery aging, vehicle friction change, etc.

Furthermore, the DTE prediction apparatus 100 may define an initial linear regression model reflecting the Bayesian probability distribution as a prior probability model, and may further define a posterior probability model based on collected driving data.

Furthermore, the DTE prediction apparatus 100 may correct the DTE based on a cluster model for each personalized driving pattern. In the instant case, personalization of the driving pattern indicates that the driver records driving data in a certain place at a certain time at a certain period. Accordingly, the DTE prediction apparatus 100 may compare a current driving position and time of the vehicle with predefined clusters, and may correct the DTE by use of a driving pattern of a cluster at a same time point (e.g., a driving time, a destination, a road type between drivings, etc.).

Referring to FIG. 1, the DTE prediction apparatus 100 may include a communication device 110, a storage 120, an interface device 130, and a processor 140.

The communication device 110 is a hardware device implemented with various electronic circuits to transmit and receive signals through a wireless or wired connection, and may transmit and receive information based on in-vehicle devices and in-vehicle network communication techniques. As an exemplary embodiment of the present disclosure, the in-vehicle network communication techniques may include Controller Area Network (CAN) communication, Local Interconnect Network (LIN) communication, flex-ray communication, and the like.

The storage 120 may store data and/or algorithms required for the processor 140 to operate, and the like.

As an exemplary embodiment of the present disclosure, the storage 120 may store a DTE prediction model and a driving pattern personalization cluster model for predicting the DTE, and data and/or algorithms for driving each model.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the apparatus 100 and results thereof. Herein, the input means may include a key button, and may include a mouse, a joystick, a jog shuttle, a stylus pen, and the like. Furthermore, the input means may include a soft key implemented on the display.

The interface device 130 may be implemented as a head-up display (HUD), a cluster, an audio video navigation (AVN), or a human machine interface (HM), a human machine interface (HMI).

The output device may include a display, and may also include a voice output means such as a speaker. In the instant case, if a touch sensor formed of a touch film, a touch sheet, or a touch pad is provided on the display, the display may operate as a touch screen, and may be implemented in a form in which an input device and an output device are integrated.

Figure 2:
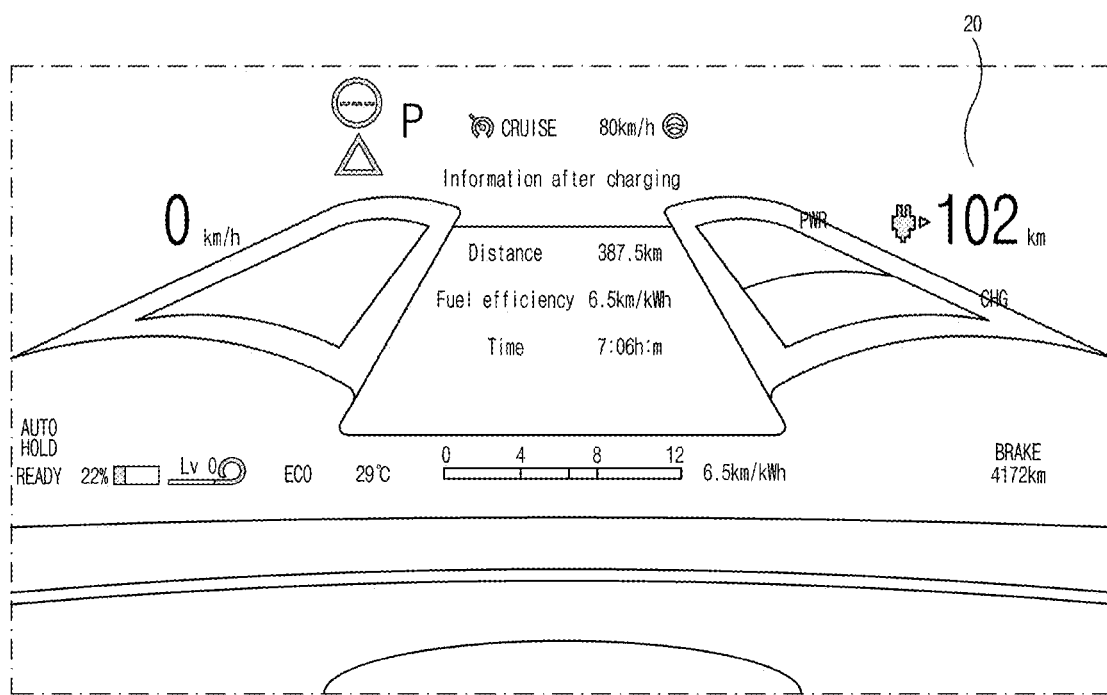
FIG. 2 illustrates an example view showing a distance to empty.

For example, in an exemplary embodiment of the present disclosure, the output device may output a DTE 20 as illustrated in FIG. 2. FIG. 2 illustrates an example view showing a distance to empty.

In the instant case, the display may include at least one of a liquid crystal display (LCD), a thin film transistor liquid crystal display (TFT LCD), an organic light emitting diode display (OLED display), a flexible display, a field emission display (FED), a 3D display, or any combination thereof.

The processor 140 may be electrically connected to the communication device 110, the storage 120, the interface device 130, and the like, may electrically control each component, and may be an electrical circuit that executes software commands, performing various data processing and determinations described below.

The processor 140 may be configured to process a signal transferred between components of the DTE prediction apparatus 100, and may perform overall control such that each of the components can perform its function normally.

The processor 140 may be implemented in the form of hardware, software, or a combination of hardware and software. The processor 140 may be implemented as a microprocessor, but the present disclosure is not limited thereto, and may be, e.g., an electronic control unit (ECU), a micro controller unit (MCU), or other subcontrollers mounted in the vehicle.

The processor 140 may defines a DTE prediction model of a vehicle based on a linear regression model reflecting a Bayesian probability distribution, and may be configured to predict the DTE by learning the DTE prediction model based on driving data.

The processor 140 may define the linear regression model reflecting the initial Bayesian probability distribution as a prior probability model, may be configured to generate a posterior probability model based on additionally collected driving data of the vehicle and the prior probability model, may update the posterior probability model with the linear regression model reflecting the initial Bayesian probability distribution, and may be configured to predict the DTE using a linear regression model reflecting the updated Bayesian probability distribution.

The processor 140 may define a basic linear regression model including linear correlation between a dependent variable and at least one independent variable, and may define the linear regression model reflecting the Bayesian probability distribution based on the basic linear regression model.

The processor 140 may define a prior probability of a coefficient value of the linear regression model, a probability of an observation if the coefficient value of the linear regression model is given, and a posterior probability derived based on observed data regardless of the coefficient value of the linear regression model.

Independent variables of the linear regression model may include at least one of index (one step index (t)), SOC (stage of charge) consumption, mileage so far, vehicle acceleration, an SOC change rate, a vehicle speed, a steering wheel rotation angle, a rotation speed, a distance from a vehicle in front, a brake depth, a vehicle yawing parameter, vehicle longitudinal acceleration, vehicle lateral acceleration, or a combination thereof.

The processor 140 may be configured to determine whether re-learning of the DTE prediction model is required based on a difference between a prediction value of the DTE prediction model and an actual driving distance.

If the re-learning is required, the processor 140 may collect driving data for a predetermined driving period, and may learn the DTE prediction model using the collected driving data.

The processor 140 may verify performance of the learned DTE prediction model based on a predetermined evaluation index.

The processor 140 may be configured to predict the DTE using a DTE prediction model including good performance as a result of the verification.

The processor 140 may classify and generate a cluster group for each driving pattern by use of data for each driving pattern stored for a predetermined number of driving count. The data for each driving pattern may include at least one of a driving time, a driving start time, a starting position, a driving distance, a driving path, or a combination thereof.

The processor 140 may store driving history for a predetermined driving period as summary data, vectorize the driving start time, and may be configured to generate clusters based on density and a minimum number of vectorized points, and generate cluster groups using a density-based unsupervised clustering model. In the instant case, the density-based unsupervised clustering model may include density-based spatial clustering of application with noise (DBSCAN).

The processor 140 may be configured to generate a plurality of cluster groups by clustering driving time information and driving patterns including a closest distance to a median number of driving distances.

The processor 140 may select a median number of each of the cluster groups as a center point, and may select a cluster group including a center point of a closest distance to a current driving feature vector of the vehicle among the center points of the respective cluster groups.

The processor 140 may read a driving pattern and driving information of the selected cluster group from the storage, and may correct the DTE predicted by the DTE prediction model by use of the driving pattern and the driving information of the selected cluster group.

The processor 140 may select a cluster group including a high cosine similarity between the current driving feature vector of the vehicle and the driving time and day data from among the cluster groups, and may correct the DTE predicted by the DTE prediction model using the driving pattern and the driving information of the selected cluster group.

The processor 140 may be configured to determine and correct the DTE based on driving information including each road type section of a driving trajectory, a speed for each section, a pedal value for each section, a brake value for each section, an SOC value and a mileage, and a remaining SOC value, and may correct the determined DTE using the driving pattern and the driving information of the selected cluster group.

Figure 3:
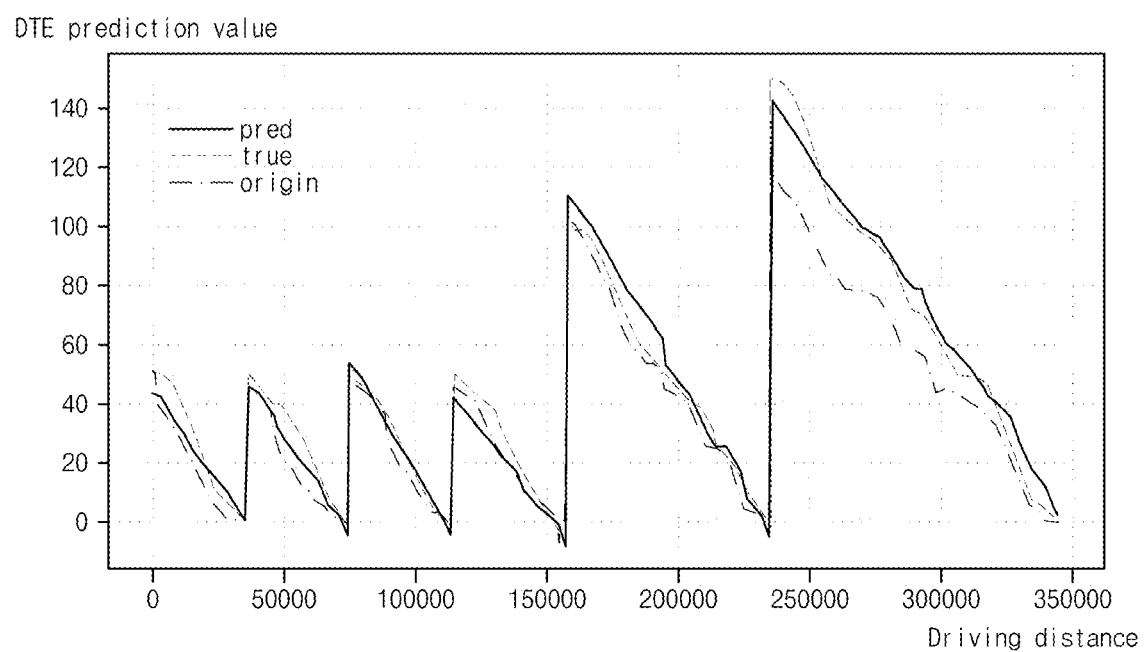
FIG. 3 illustrates an example view showing an actual mileage and a DTE prediction value.
Figure 4A:
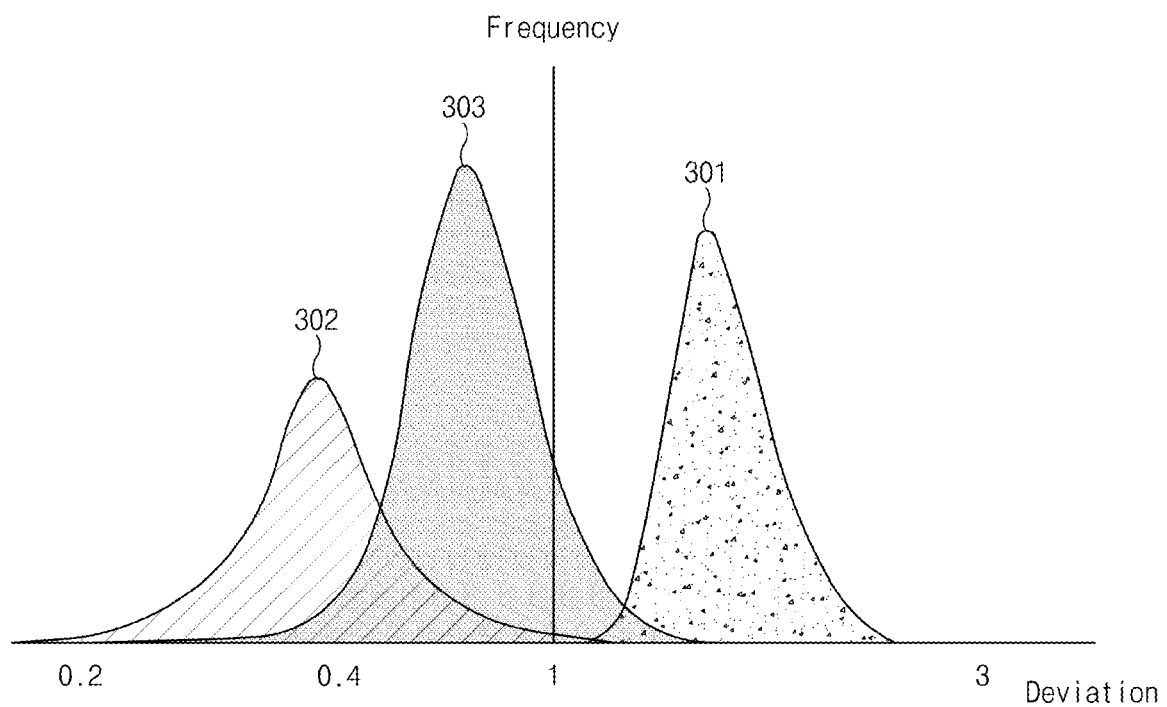
FIG. 4A illustrates an example view for describing a Bayesian linear regression model.
Figure 4B:
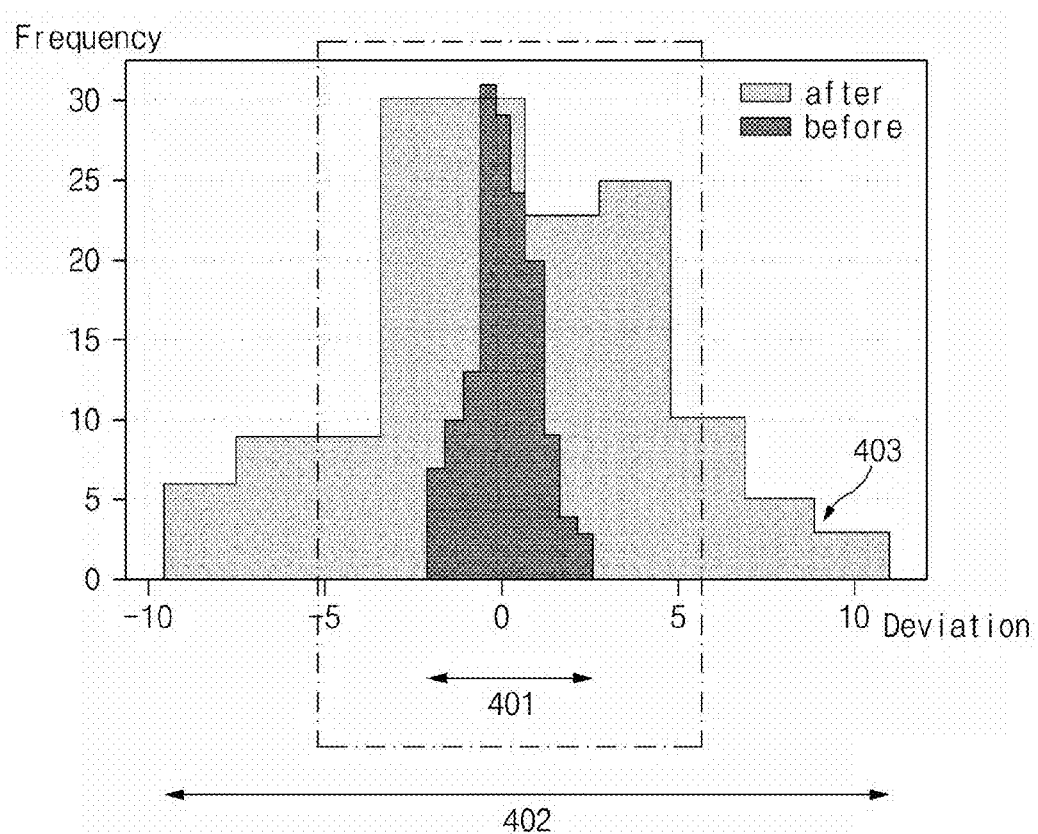
FIG. 4B illustrates an example view for describing a comparison between a DTE model prediction value and an actual mileage difference distribution.

Hereinafter, a process of generating a DTE prediction model and determining a DTE using the DTE prediction model according to an exemplary embodiment of the present disclosure will be described with reference to FIG. 3 to FIG. 4B. FIG. 3 illustrates examples of an actual mileage and a DTE prediction value. FIG. 4A illustrates an example view for describing a Bayesian linear regression model, and FIG. 4B illustrates an example view for describing a comparison between a DTE model prediction value and an actual mileage difference distribution.

The DTE prediction apparatus 100 may select a Bayesian linear regression model as a prior probability model, and may implement a posterior probability model using additionally accumulated driving data.

In the instant case, the linear regression model may be obtained by modeling linear correlation between a dependent variable Y and one or more independent variables X as shown in Equation 1 below.

Abase linear model learned with initial data to be optimized is selected as the prior probability model. Equation 1 below is a basic equation of the linear regression model.

$$y=\theta_1 x+\theta_2+\varepsilon \qquad \text{(Equation 1)}$$

The coefficient values $\theta_1$, $\theta_2$ may be estimated from the observed values x and y. The coefficient value $\varepsilon$ is error value.

ADTE prediction model may be generated based on a linear regression model such as Equation 1. In the instant case, for the DTE prediction model, 13 variables including high correlation with an SOC value and an actual mileage may be used as input variables.

In the instant case, the 13 variables may include one step index (t), State of Charge (SOC) consumption, a mileage so far, vehicle acceleration, an SOC change rate, one step index (t) as a basic derived variable, a vehicle speed, a steering wheel rotation angle, a rotation speed, a distance from a vehicle in front, a brake depth (Nm), a vehicle yawing parameter, vehicle longitudinal acceleration, vehicle lateral acceleration, and the like.

The aforementioned Equation 1 is simply expressed, and as described above, if there are 13 variables, a linear regression equation may be expressed as Equation 2 below.

$$y=\theta_1 x_1+\theta_2 x_2+\theta_3 x_3+\ldots \theta_{11}x_{11}+\theta_{12}x_{12}+\theta_{13}x_{13}+\theta_{14}x_{14} \qquad \text{(Equation 2)}$$

The DTE prediction apparatus 100 utilizes a loss function to find an optimal coefficient value, and the loss function is, e.g., MSE.

The DTE prediction apparatus 100 may obtain a global optimal parameter by applying a gradient descent method using a loss function.

Furthermore, the DTE prediction apparatus 100 may be configured to determine performance of the DTE prediction model based on the loss function such as Mean Squared Error (MSE), Mean Absolute Error (MAE), or R2_score. In the instant case, it may be determined that the performance of the DTE prediction model is excellent as the R2_score (0 to 1) is higher and the MAE and MSE are smaller. Such a basic linear regression model may be applied for vehicle development.

FIG. 3 illustrates a comparison between a DTE prediction value (pred) by a linear regression model, an actual mileage (true), and a predicted value (origin) of an existing DTE prediction model. As illustrated in FIG. 3, it may be seen that the DTE prediction value (pred) by the linear regression model is similar to the actual driving distance (true) compared to the predicted value (origin) of the existing DTE prediction model.

TABLE 1

| Prediction method | Evaluation index | | |
|---|---|---|---|
| | R2_score | MAE | MSE |
| Linear regressor | 0.97 | 4.77 | 35 |
| Light GRM | 0.44 | 19.25 | 366 |
| Random Forest | 0.67 | 23.33 | 11163 |
| Conventional DTE model | 0.84 | 9.15 | 155 |

Table 1 above shows performance evaluation values of evaluation indicators for each prediction method, and as shown in Table 1, it may be seen that the R2_score of the linear regression method is high and the MAE and MSE are small compared to light GRM, random forest, and the existing DTE prediction method.

Table 2 below indicates evaluation index values before and after driving at a predetermined A (km). Referring to the table below, the performance before driving A (km) is superior to the performance after driving.

TABLE 2

| Evaluation index | Division | |
|---|---|---|
| | Before driving A (km) | After driving A (km) |
| R2_score | 0.97 | 0.91 |
| MAE | 4.77 | 10.1 |
| MSE | 35 | 47 |

If the observed values x and y of Equation 1 are reduced to x and the parameter $\theta_1$, $\theta_2$ is reduced to $\theta$, the Bayesian linear regression model may be defined as shown in Equation 3 below.

$$P(\theta/x) = \frac{P(x/\theta)P(\theta)}{P(x)} \qquad \text{(Equation 3)}$$

Equation 3 determines the probability distribution of $\theta$ through x, and $P(\theta)$ becomes a linear regression model as a prior probability, and $\theta$ indicates a coefficient (parameter) value of the linear regression model. $P(x|\theta)$ is a probability of an observation if parameters are given. $P(x)$ is a probability of getting x regardless of the parameters. $P(\theta|x)$ is a posterior probability model based on observed data. There may be several $\theta$ of the posterior probability, but a parameter with a high evaluation index is selected. If an amount of data (x) to be collected is large and includes a constant distribution, the distribution of the posterior probability may include an optimal value.

$$y=\theta_1 x+\theta_2+\varepsilon \rightarrow P(\theta) \qquad \text{(Equation 4)}$$

Equation 3 may be updated to a linear regression equation $P(\theta)$ with a prior probability as shown in Equation 4 below.

The DTE prediction apparatus 100 may collect data of an actual driving distance and DTE prediction value (predicted driving distance) for each driving cycle (driving cycle, DC, driving once), and may compare the actual driving distance with the DTE prediction value for each driving cycle. The DTE prediction apparatus 100 may be configured to determine that accuracy of the past DTE prediction model has deteriorated if the deviation distribution exceeds the reference normal distribution as a result of comparing the actual mileage and the DTE prediction value for each driving period, and accordingly, may be configured to determine that re-learning of the DTE prediction model is required. In the instant case, performance of the DTE prediction model may deteriorate due to seasonal factors, changes in friction between parts in the vehicle, changes in battery performance, and changes in a main driver.

The DTE prediction apparatus 100 may select a basic linear model as a prior probability model, and may be configured to generate a Bayesian linear regression model as a posterior probability model using collected data. In the instant case, the posterior probability model may be generated as a plurality of models.

Thereafter, the DTE prediction apparatus 100 may compare the actual driving distance and the DTE prediction value based on the posterior probability models for every IDC driving, and may be configured to determine performance using an evaluation index (e.g., MAE, MSE, or R2_score). Table 3 below is a performance comparison table of the basic linear regression model and the Bayesian linear regression model.

TABLE 3

| | Division | | |
|---|---|---|---|
| | Base Linear Regression Model | | Bayesian |
| Evaluation index | Before driving A (km) | After driving A (km) | non-linear regression model |
| R2_score | 0.97 | 0.91 | 0.95 |
| MAE | 4.77 | 10.1 | 5.1 |
| MSE | 35 | 47 | 39 |

The basic linear regression model may have different performance before and after driving, and the Bayesian linear regression model, which is the posterior probability model applied in an exemplary embodiment of the present disclosure, may collect and learn data before and after driving, and may relearn it if performance before and after driving changes.

If there are multiple posterior probability models, a posterior probability model with a best performance evaluation result may be selected and updated as a DTE prediction model.

FIG. 4A illustrates a probability distribution 301 of the basic linear regression equation, a probability distribution 302 of actual driving data, and a probability distribution 303 based on the Bayesian linear regression equation.

FIG. 4B illustrates a comparison between a prediction value of the DTE prediction model and an actual mileage difference distribution. It may be seen that a difference between the prediction value of an initial DTE prediction model and an actual mileage 401 is small, but after driving at 10,000 km, the difference between the prediction value of the DTE prediction model and an actual mileage 402 deviates from a margin range 403 and becomes larger.

Hereinafter, a process of determining a DTE to which a driving pattern personalization cluster model of the present disclosure is applied will be described with reference to FIG. 5 to FIG. 10.

Driver regular driving patterns (e.g., driving a certain distance at a certain time, such as commuting to and from work or school) may be clustered, and if energy consumption and driving patterns may be predicted in advance and reflected in DTE determination. That is, in the case of regular driving, there is a high probability that a same driver will ride with a same passenger at a same time. A driver may use navigation for the first time, but if driving regularly, the driver may drive by experience without using the navigation, and a driving load may be determined in advance for each road type and section of a driving path using existing navigation history or driving history.

The DTE prediction apparatus 100 may be configured to generate the driving pattern personalization cluster model. The driving pattern personalization cluster model may classify cluster groups by driving pattern. For example, if a driving start time, a position of a driving start point, a driving distance, etc. are the same, they may be classified into a same cluster group.

To the present end, the DTE prediction apparatus 100 may store each driving history as summary data rather than time series. That is, the DTE prediction apparatus 100 may store driving pattern statistical values (an average vehicle speed, acceleration, a pedal index, relative positive acceleration (RPA), etc.) for each road type or each road section.

Furthermore, the DTE prediction apparatus 100 may vectorize the driving start time (vectorized into x and y coordinates based on 24 hours). In the instant case, if the driving time itself is vectorized, the DTE prediction apparatus 100 may mistakenly determine that a vector distance of 23:59 and 00:1 as a very long temporal distance, although it is actually a short temporal distance. Accordingly, the DTE prediction apparatus 100 may recognize 23:59 and 00:1 as very close distances by converting radian (unit of angle (plane angle)) values of 24 hours of driving into x and y coordinates.

Furthermore, the DTE prediction apparatus 100 may be configured to generate clusters based on density and a minimum number of points, and may not pre-determine a number of the clusters.

Figure 5A:
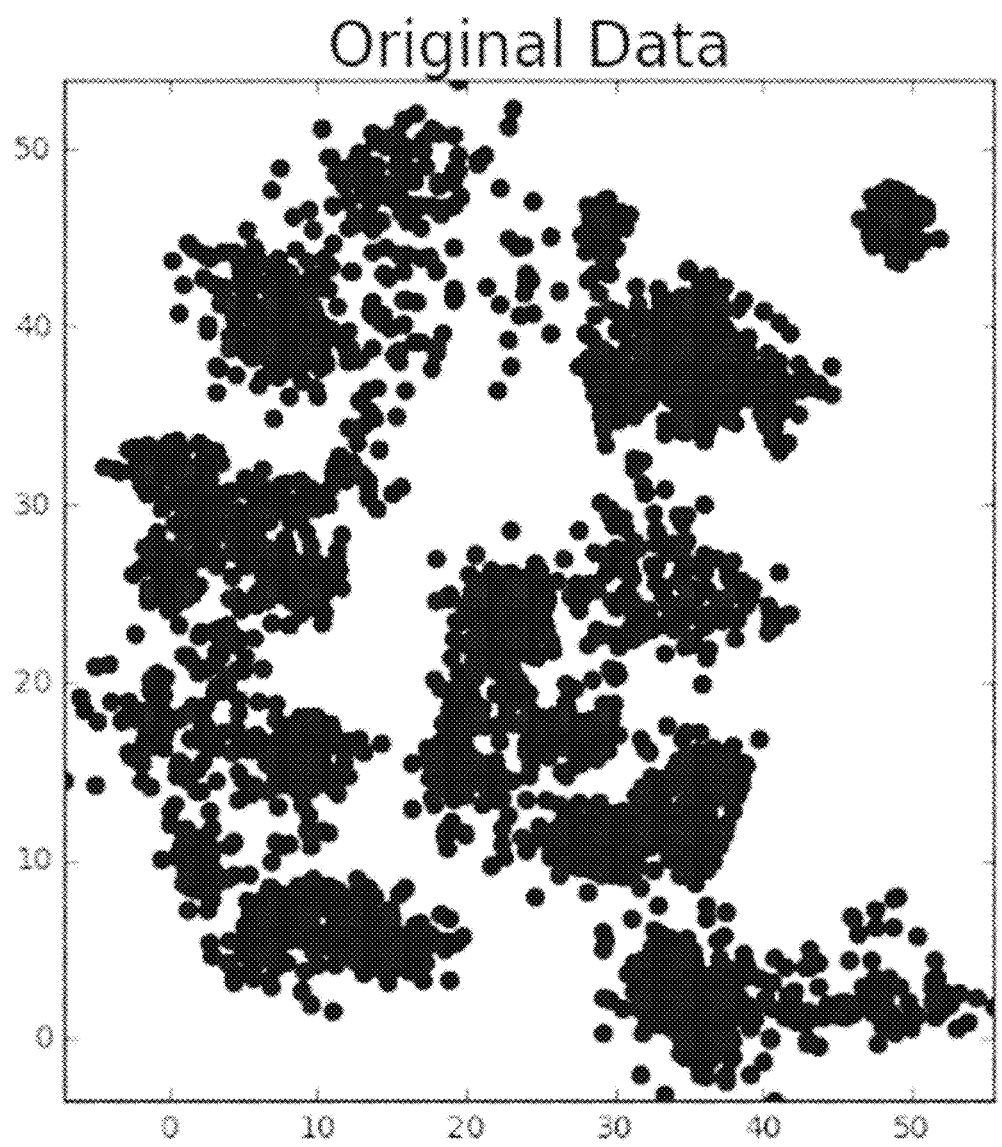
FIG. 5A and FIG. 5B each illustrate an example view for describing DBSCAN clustering.
Figure 5B:
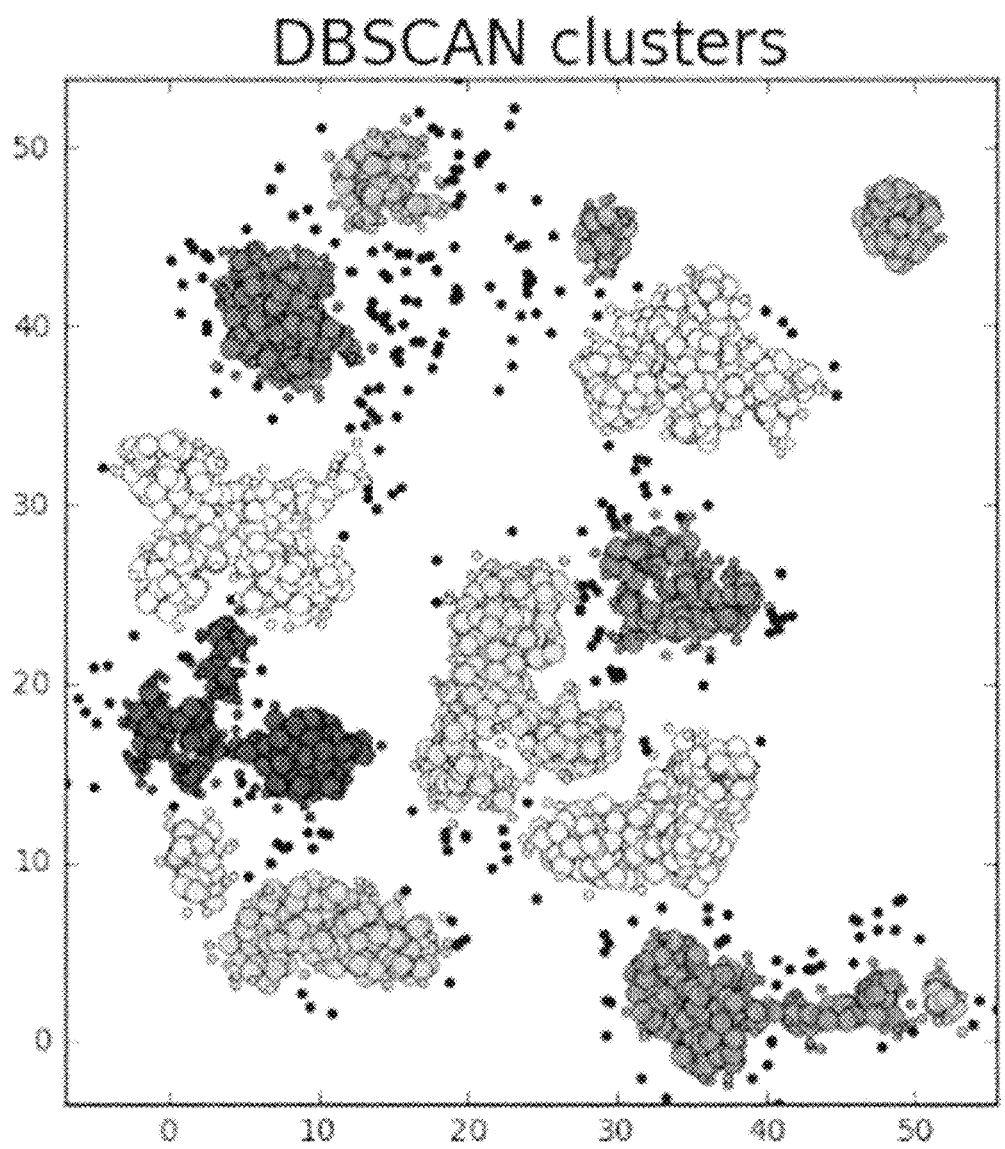

The DTE prediction apparatus 100 may be configured to generate a clustering model using DBSCAN, which is a density-based unsupervised cluster model, as illustrated in FIG. 5A. FIG. 5A illustrates a view for describing DBSCAN according to an exemplary embodiment of the present disclosure. FIG. 5B illustrates an example in which feature vectors for each distance are made into points and the points are clustered. In the instant case, the DTE prediction apparatus 100 may classify clusters based on a driving start time and a total driving distance. That is, the DTE prediction apparatus 100 applies density-based spatial clustering of application with noise (DBSCAN), which is density-based clustering, to cluster driving patterns. For clustering, kmeans based on Euclidean distance may be typically used, but how many clusters to select may be different for each customer, so it may not be possible to unify the number, and because a distance-based method includes a limitation of clustering in a circle centered on a central point, a clustering model may be generated using DBSCAN in an exemplary embodiment of the present disclosure.

Subsequently, the DTE prediction apparatus 100 may be configured to determine a global optimal cluster by tuning epsilon, which is a number-based radius constant, and a number of minimum points (num_sample).

Furthermore, the DTE prediction apparatus 100 may optimize parameters for epsilon and the number of minimum points (num_sample) for each individual vehicle, and may optimize the number of minimum points (num_sample) with a silhouette analysis method.

Furthermore, derived variables of the cluster model include driving dates, generation of days according to dates, weekdays and weekends, and basic variables may include driving distance and datetime.

TABLE 4

| Cluster number | Number | Average mileage (m) | Standard deviation (m) |
|---|---|---|---|
| −1 (driving without regularity) | 874 | 3,770 | 3,756 |
| Cluster #1 | 13 | 12,782 | 96 |
| Cluster #2 | 10 | 1,397 | 203 |

Table 4 shows a number of points, an average driving distance, and a standard deviation value for each cluster group.

After the vehicle is started, the DTE prediction apparatus 100 may read time data of a predefined cluster and driving statistics of a cluster including high cosine similarity with the day data of the week, and may correct the DTE by reflecting existing statistical information while driving.

Figure 6:
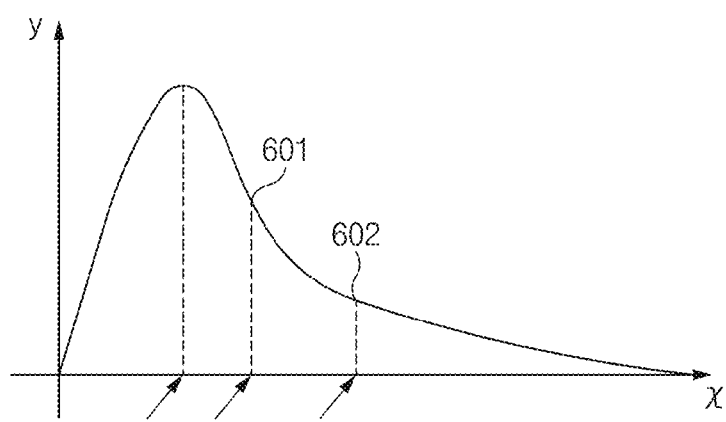
FIG. 6 illustrates an example view for describing a process of selecting a cluster.

FIG. 6 illustrates an example view for describing a process of selecting a cluster. As illustrated in FIG. 6, driving patterns with a closest distance from information (x, y) of a driving time and a median number (50% level value) of a driving distance may be selected. In FIG. 6, a median number 601 may include an average 602, and a cluster group corresponding to the median number 601 may be selected. For example, if a cluster 1, a cluster 2, and a cluster 3 exist as cluster groups and cluster 1 is selected, a median value vector of feature vectors in cluster 1 may be selected as a center point. In the instant case, if the average 602 is selected as the center point, if an outlier occurs, a phenomenon which is biased to one side may occur, and because the median number 601 is a value in the middle, it may be closer to the central point (the central point of the cluster), and thus the median number 601 rather than the average 602 may be selected as the center point.

Figure 7:
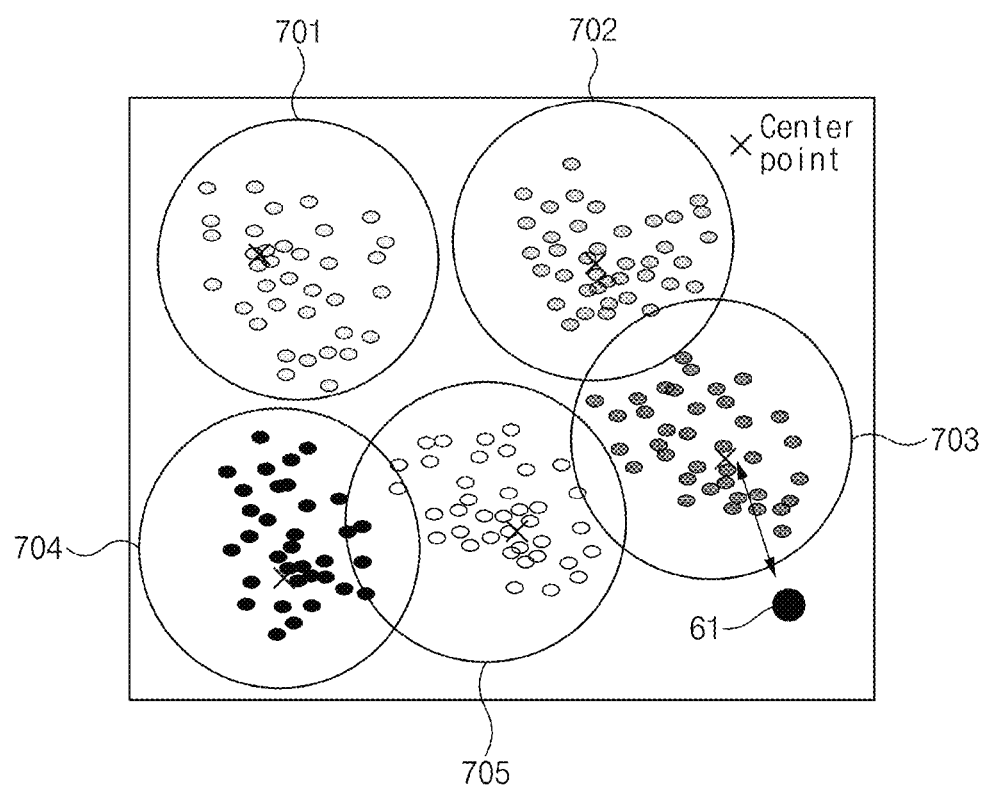
FIG. 7 illustrates an example view for describing a process of selecting a cluster based on a distance between a center point and vectors.
Figure 8:
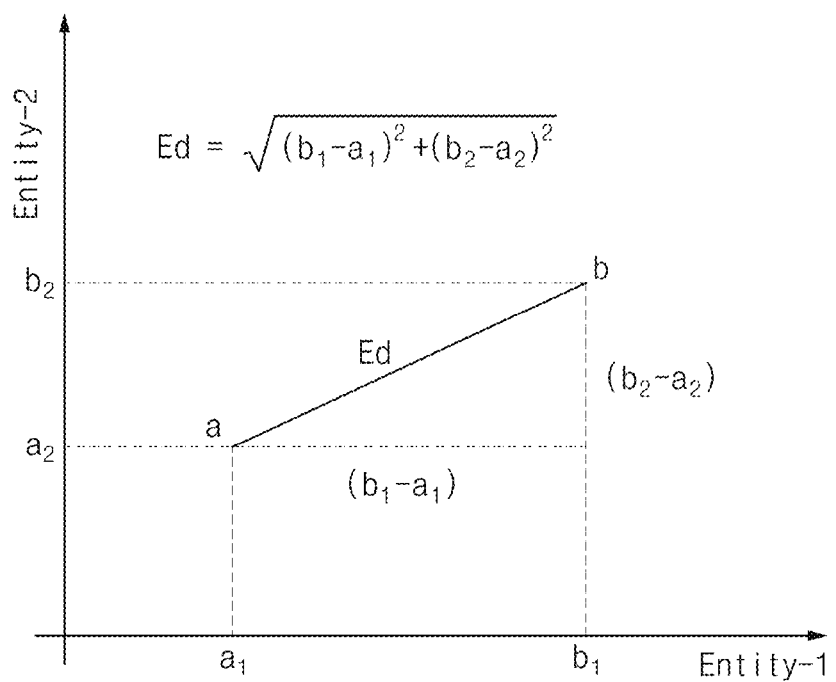
FIG. 8 illustrates an example view for describing a Euclidean distance determination method.

FIG. 7 illustrates an example view for describing a process of selecting a cluster based on a distance between a center point and vectors, and FIG. 8 illustrates an example view for describing a Euclidean distance determination method.

Referring to FIG. 7, if there are a first cluster 701, a second cluster 702, and a third cluster 703, a fourth cluster 704, and a fifth cluster 705, the third cluster 703 positioned closest to a position of a current driving condition vector 61 and a center point of each of the clusters may be selected.

Referring to FIG. 8, the third cluster 703 including a central point including a shortest Euclidean distance of the position of the current driving condition vector 61 may be selected among the center points of the first cluster 701, the second cluster 702, the third cluster 703, the fourth cluster 704, and the fifth cluster 705, by use of a Euclidean distance determination method.

Figure 9:
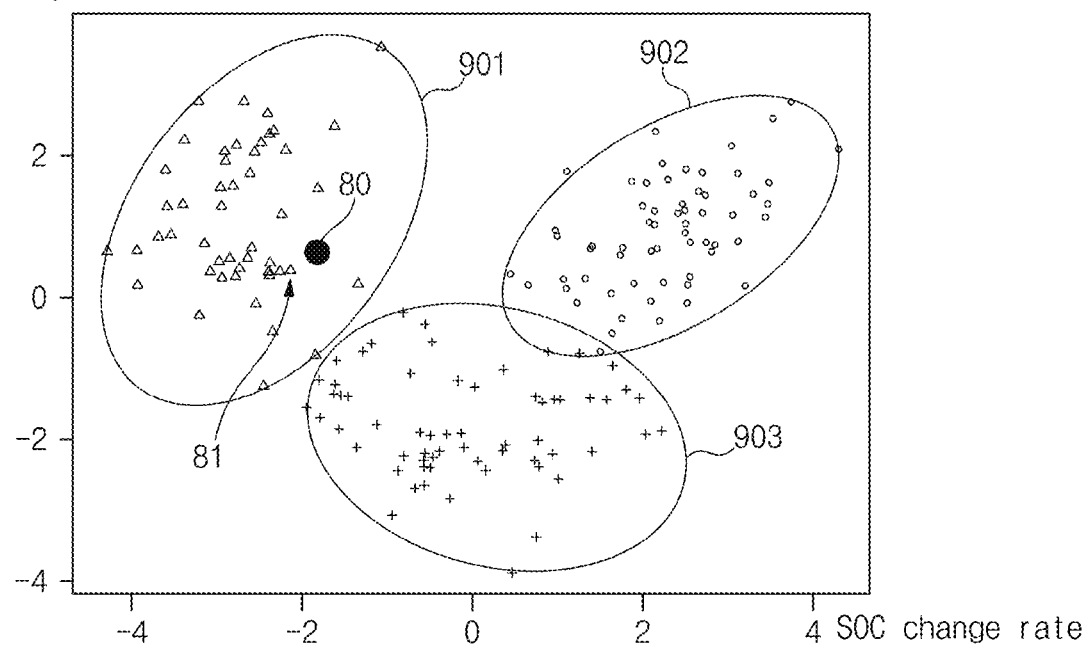
FIG. 9 illustrates an example view for describing a process of correcting a DTE based on a DTE prediction model.

FIG. 9 illustrates an example view for describing a process of correcting a DTE based on a DTE prediction model, and FIG. 10 illustrates an example table for describing a process of correcting a DTE based on a DTE prediction model.

Referring to FIG. 9, if there are a first cluster 901, a second cluster 902, and a third cluster 903 and the first cluster 901, the DTE prediction apparatus 100 may read data on a driving pattern 81 closest to a current driving condition vector 80 in the first cluster 901. The DTE prediction apparatus 100 may be configured to determine a current SOC based on a distance traveled to a destination, SOC consumption, and driving characteristics (changes in vehicle speed and changes in pedal and brake change) before driving, and may be configured to determine the DTE based on the current SOC. That is, the DTE prediction apparatus 100 may be configured to determine a remaining DTE based on a remaining SOC by use of the relationship between a past driving distance and SOC consumption.

As illustrated in FIG. 10, the DTE prediction apparatus 100 may redetermine an amount of SOC usage by reflecting a driving pattern with a short distance and SOC consumption among vectors of the current driving pattern in the current road section and the driving pattern vectors in the same road section in the cluster.

Accordingly, after the vehicle is started, the DTE prediction apparatus 100 may read a time of a predefined cluster or driving statistics of a cluster including high cosine similarity with the day data of the week, and may correct the DTE by reflecting existing statistical information while driving.

Figure 11:
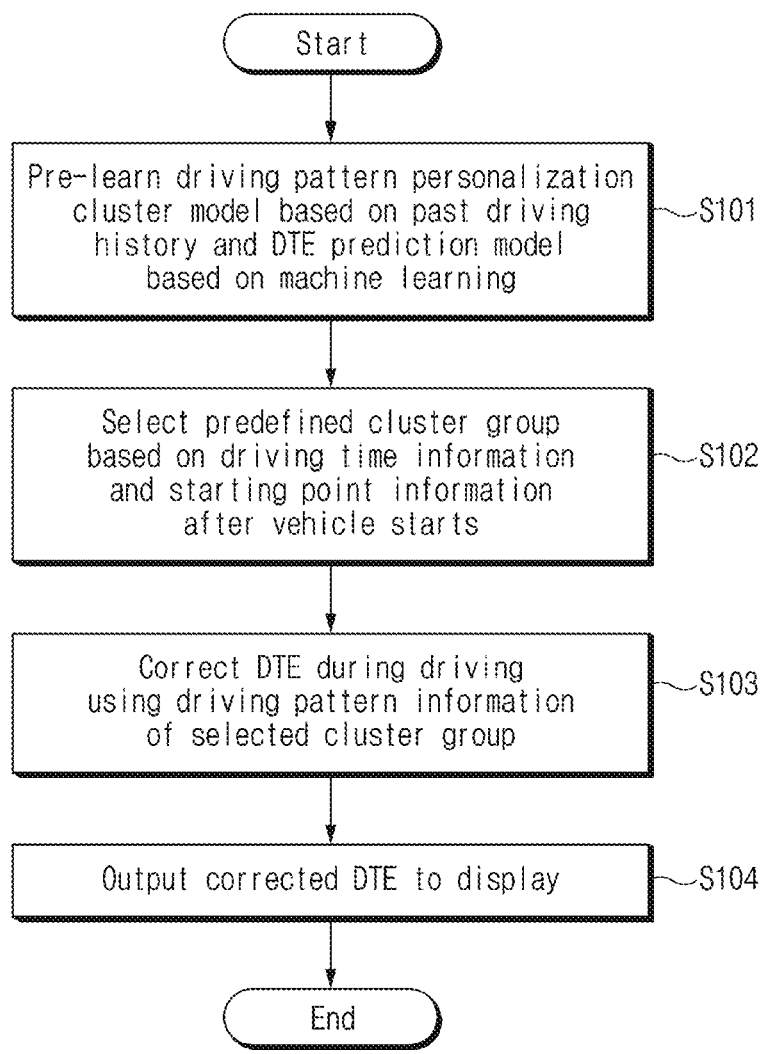
FIG. 11 illustrates an example flowchart showing a DTE prediction method.
Figure 12:
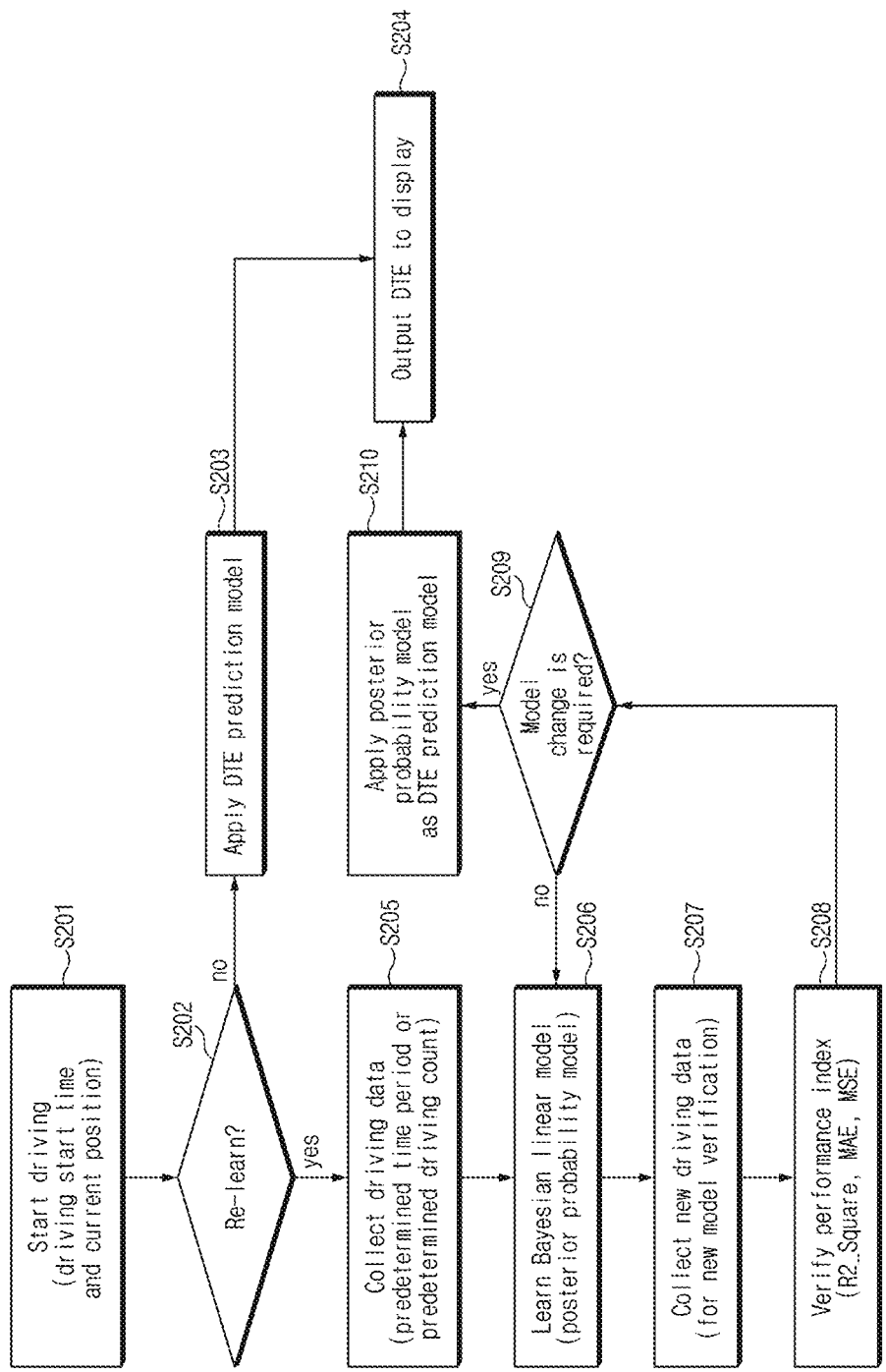
FIG. 12 illustrates an example flowchart for describing a method of predicting a DTE based on a DTE prediction model.
Figure 13:
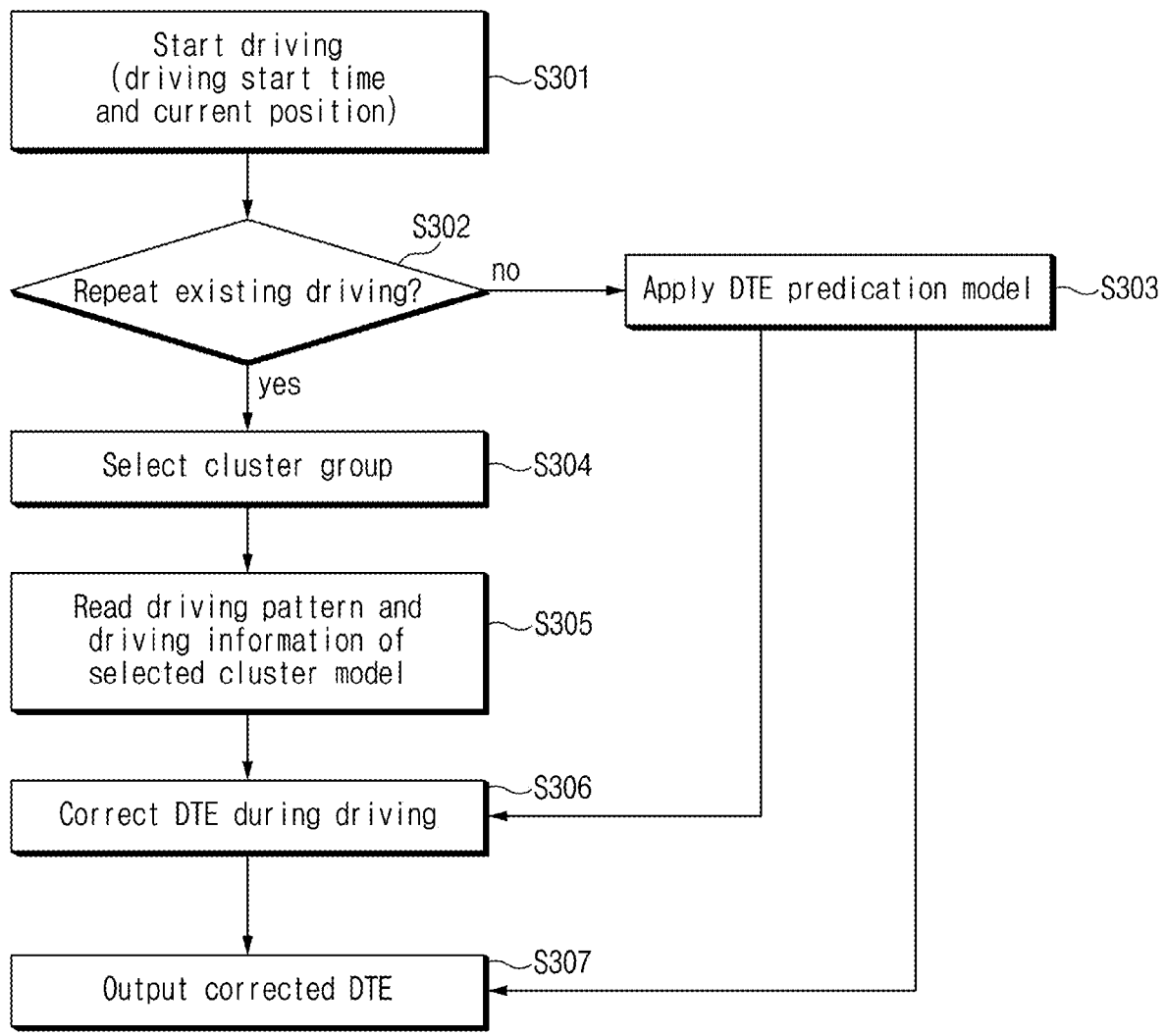
FIG. 13 illustrates an example flowchart showing a method of correcting a DTE based on a driving pattern personalization cluster model.
Figure 14:
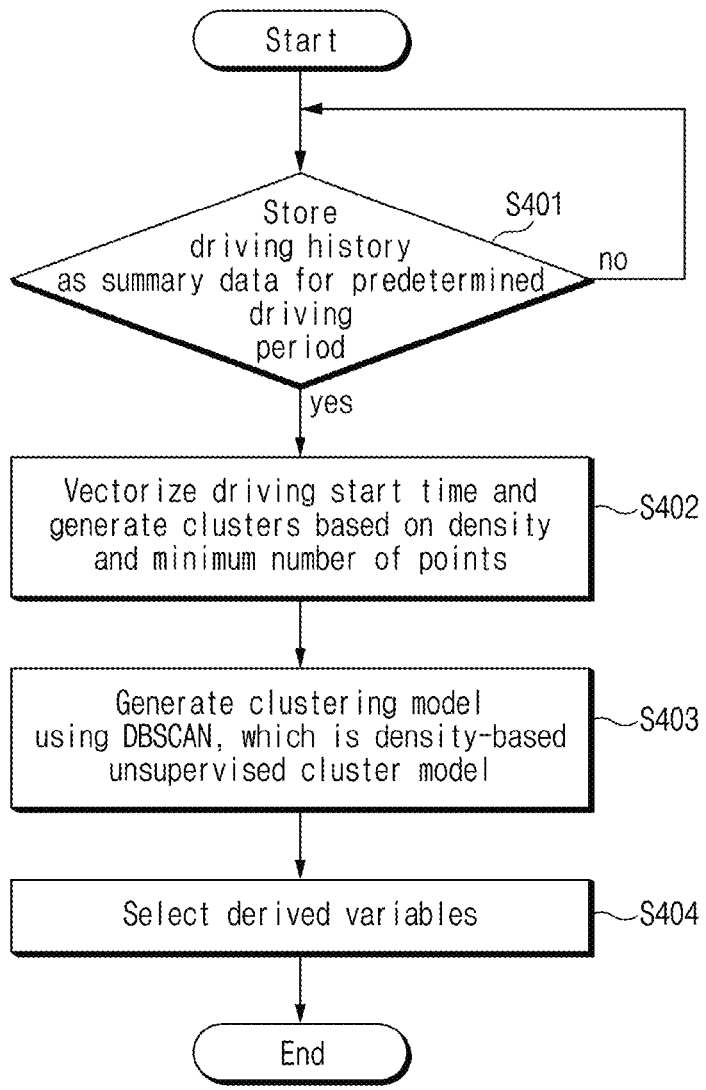
FIG. 14 illustrates an example flowchart showing a method of generating a driving pattern personalization cluster model.

Hereinafter, a DTE prediction method according to an exemplary embodiment of the present disclosure will be described in detail with reference to FIG. 11 to FIG. 14. FIG. 11 illustrates an example flowchart showing a DTE prediction model, FIG. 12 illustrates an example flowchart for describing a method of predicting a DTE based on a DTE prediction model, FIG. 13 illustrates an example flowchart showing a method of correcting a DTE based on a driving pattern personalization cluster model, and FIG. 14 illustrates an example flowchart showing a method of generating a driving pattern personalization cluster model.

Hereinafter, it is assumed that the DTE prediction apparatus 100 of FIG. 1 performs the processes of FIG. 11 to FIG. 14. Furthermore, in the description of FIG. 11 to FIG. 14, operations described as being performed by the device may be understood as being controlled by the processor 140 of the DTE prediction apparatus 100.

Referring to FIG. 11, the DTE prediction apparatus 100 may pre-learn a driving pattern personalization cluster model based on past driving history and a DTE prediction model based on machine learning (S101).

Subsequently, after the vehicle is started, the DTE prediction apparatus 100 may select a predefined cluster group based on driving time information and starting point information (S102).

The DTE prediction apparatus 100 may correct the DTE while driving using driving pattern information of the selected cluster group (S103).

The DTE prediction apparatus 100 may output the corrected DTE to a display (S104).

Referring to FIG. 12, if driving starts (S201), the DTE prediction apparatus 100 may determine whether re-learning of the DTE prediction model is required (S202).

That is, the DTE prediction apparatus 100 may compare an actual driving distance with a prediction DTE value for each driving period DC (driving once), may be configured to determine whether a difference between the DTE prediction value and an actual mileage is greater than or equal to a predetermined reference value, since if it is greater than or equal to the predetermined reference value, the difference between the DTE prediction value and the actual mileage is determined to be large, and may be configured to determine a state in which the re-learning of the DTE prediction model is required to increase the accuracy of the DTE prediction model. On the other hand, if the difference between the DTE prediction value and the actual mileage is less than the predetermined reference value, the DTE prediction apparatus 100 may be configured to determine that the re-learning of the DTE prediction model is not required because the DTE prediction value is almost similar to the actual mileage and thus the accuracy of the DTE prediction value is high. That is, as illustrated in FIG. 4B, the prediction value of the DTE prediction model and the actual mileage are initially almost similar to each other, but if driving is performed for a predetermined distance, a difference value therebetween increases, and re-learning is required to compensate for the difference value.

In the instant case, it may be possible to determine whether the DTE prediction model needs the re-learning based on a predetermined number of times, e.g., a difference between a DTE prediction value of 100 DC and an actual mileage, rather than 1DC.

If the re-learning of the DTE prediction model is not required, the DTE prediction apparatus 100 may be configured to determine the DTE by applying a previously learned DTE prediction model (S203), and may output the determined DTE to a display (S204).

On the other hand, if the re-learning of the DTE prediction model is required, the DTE prediction apparatus 100 may collect driving data for a certain period or for a certain number of times (S205), and may learn a Bayesian linear model, which is a posterior probability model, based on the collected data (S206).

Thereafter, the DTE prediction apparatus 100 may collect new driving data to verify the relearned Bayesian linear model (S207). Furthermore, the DTE prediction apparatus 100 may verify performance of the Bayesian linear model using an MSE as a loss function (S208).

The DTE prediction apparatus 100 may be configured to determine whether the relearned Bayesian linear model is used as the DTE prediction model (S209), if a relearned Bayesian linear model is used as the DTE prediction model, may be configured to determine the DTE by applying the Bayesian linear model, which is the posterior probability model, as the DTE prediction model (S210), and may output the determined DTE to a display (S204).

Referring to FIG. 13, after driving starts (S301), the DTE prediction apparatus 100 may be configured to determine whether to repeat the existing driving (S302). That is, the DTE prediction apparatus 100 may be configured to determine whether there has been same driving in the past based on a start time of the driving and a current position of the vehicle at the start of the driving. The driving pattern personalization cluster model may be applied if regular driving coincides.

If the existing driving is not repeated, the DTE may be determined based on the DTE prediction model of FIG. 12 described above (S303).

On the other hand, if the existing driving is repeated, the DTE prediction apparatus 100 may select a cluster group based on a driving start time and a current position of the vehicle (S304). That is, the DTE prediction apparatus 100 may select a cluster group including a same driving start time and a same starting position of the vehicle among the driving start time, the current position of the vehicle, and the previous driving history. As illustrated FIG. 7 described above, among a plurality of cluster groups, a cluster group including a closest center point to a driving pattern vector of the vehicle may be selected.

The DTE prediction apparatus 100 may read a driving pattern and driving information of the selected cluster model from the storage 120 (S305), and may correct the DTE determined in FIG. 12 based on the corresponding driving pattern and driving information (S306). As illustrated in FIG. 9, the driving pattern 81 closest to the driving pattern vector 80 may be read.

The DTE prediction apparatus 100 may output the corrected DTE 20 to a display as illustrated in FIG. 2 (S307).

FIG. 14 illustrates an example flowchart showing a method of generating a driving pattern personalization cluster model.

Referring to FIG. 14, the DTE prediction apparatus 100 may stores driving history as summary data for a predetermined driving count (S401). In the instant case, the predetermined driving count may be determined by an experimental value, and for example, it may be determined whether 100 DC has been completed. In the instant case, the driving history may include a driving pattern statistical value for each road type or a driving pattern statistical value for each road section. Furthermore, the driving pattern statistical value may include an average vehicle speed, an accelerator pedal index, and relative positive acceleration (RPA).

Subsequently, the DTE prediction apparatus 100 may vectorize the driving start time. In the instant case, the x and y coordinates may be vectorized based on 24 hours. The DTE prediction apparatus 100 may be configured to generate clusters based on density and a minimum number of points (S402). That is, the DTE prediction apparatus 100 may display points as illustrated in FIG. 5B without predetermining a number of clusters, and may be configured to generate clusters based on the density of the points and the minimum number of the points.

The DTE prediction apparatus 100 may be configured to generate a clustering model using DBSCAN, which is a density-based unsupervised cluster model (S403). At the instant time, the DTE prediction apparatus 100 may perform clustering using a driving start time and a total driving distance as inputs of the clustering model, and may be configured to determine a global optimum cluster by tuning a number-based radius constant (epsilon) and the minimum number of the points (num_sample). In the instant case, parameters for the number-based radius constant (epsilon) and the minimum number of the points (num_sample) may be optimized for each individual vehicle, and the minimum number of the points (num_sample) may be optimized by a silhouette analysis method.

Furthermore, a driving distance and a date time may be selected for derived variables as inputs of the cluster model (S404).

Accordingly, according to an exemplary embodiment of the present disclosure, it may be possible to check whether a cluster model is used, to read a driving pattern of the selected cluster model by selecting a cluster group related to current driving, and to determine a DTE based on the driving pattern. In the instant case, the driving pattern may include a section of each road type, a speed for each road type, accelerator pedal value for each section, a statistical value of derived variables for brake values for each section, an SOC value, and mileage, etc., and a DTE before driving may be determined using the driving information and the remaining SOC.

Furthermore, according to an exemplary embodiment of the present disclosure, a vehicle device provided in the vehicle may collect and store driving data while the vehicle is driving, and using this, an artificial intelligence-based Bayesian linear regression model may be learned to accurately predict DTE.

Furthermore, according to an exemplary embodiment of the present disclosure, a posterior probability model may be defined using additionally collected driving data based on the prior probability model, and the posterior probability model may continue to be improved by updating the posterior probability model to the prior probability model to predict the DTE.

Furthermore, according to an exemplary embodiment of the present disclosure, it may be possible to generate a robust DTE prediction model for noisy data, and even if a prior probability is unclear, it may converge to the optimized DTE prediction model as a posterior probability is continuously updated for additional data.

Accordingly, according to an exemplary embodiment of the present disclosure, in a stage of the vehicle, a DTE prediction model suitable for characteristics of each vehicle may be developed, it may be developed by varying data resolution, and various derived variables may be generated by use of high-resolution data. Furthermore, according to an exemplary embodiment of the present disclosure, it may be possible to prevent data loss by estimating the DTE in a controller inside the vehicle, not outside the vehicle.

Figure 15:
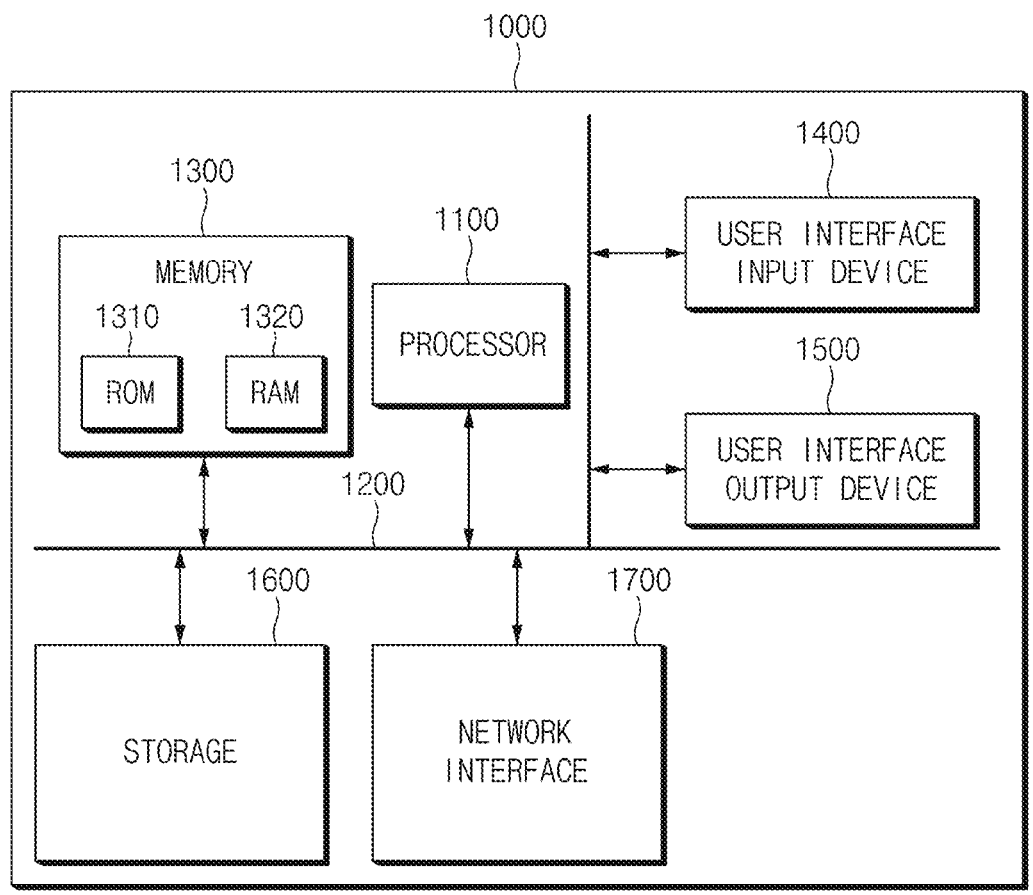
FIG. 15 illustrates an example computing system.

FIG. 15 illustrates an example computing system.

Referring to FIG. 15, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A distance to empty (DTE) prediction apparatus comprising:
a processor configured for defining a DTE prediction model of a vehicle based on a linear regression model reflecting a Bayesian probability distribution, and for predicting a DTE by learning the DTE prediction model based on driving data of the vehicle, and for providing the predicted DTE to a user; and
a storage configured to store data and algorithms driven by the processor,
wherein the processor is further configured for defining the linear regression model reflecting an initial Bayesian probability distribution as a prior probability model, and generating a posterior probability model based on additionally collected driving data of the vehicle and the prior probability model, and for controlling the vehicle to follow the DTE prediction model.

2. The DTE prediction apparatus of claim 1, wherein the processor is further configured:
for updating the posterior probability model with the linear regression model reflecting the initial Bayesian probability distribution, and
for predicting the DTE using a linear regression model reflecting the updated Bayesian probability distribution.

3. The DTE prediction apparatus of claim 2, wherein the processor is further configured for:
defining a basic linear regression model including linear correlation between a dependent variable and at least one independent variable, and
defining the linear regression model reflecting the Bayesian probability distribution based on the basic linear regression model.

4. The DTE prediction apparatus of claim 3, wherein the processor is further configured for defining a prior probability of a coefficient value of the linear regression model, a probability of an observation in a response that the coefficient value of the linear regression model is given, and a posterior probability derived based on observed data regardless of the coefficient value of the linear regression model.

5. The DTE prediction apparatus of claim 3, wherein independent variables of the linear regression model includes at least one of index (one step index (t)), SOC (stage of charge) consumption, mileage so far, vehicle acceleration, an SOC change rate, a vehicle speed, a steering wheel rotation angle, a rotation speed, a distance from a vehicle in front, a brake depth, a vehicle yawing parameter, vehicle longitudinal acceleration, vehicle lateral acceleration, or a combination thereof.

6. The DTE prediction apparatus of claim 1, wherein the processor is further configured for determining whether re-learning of the DTE prediction model is required based on a difference between a prediction value of the DTE prediction model and an actual driving distance.

7. The DTE prediction apparatus of claim 6, wherein the processor is configured, in a response that the re-learning is required, for collecting driving data for a predetermined driving period, and for learning the DTE prediction model using the collected driving data.

8. The DTE prediction apparatus of claim 7, wherein the processor is further configured for verifying performance of the learned DTE prediction model based on a predetermined evaluation index.

9. The DTE prediction apparatus of claim 8, wherein the processor is further configured for predicting the DTE using a DTE prediction model including good performance as a result of the verification.

10. The DTE prediction apparatus of claim 1, wherein the processor is further configured for classifying and generating a cluster group for each driving pattern by use of data for each driving pattern stored for a predetermined number of driving count.

11. The DTE prediction apparatus of claim 10, wherein the data for each driving pattern includes at least one of a driving time, a driving start time, a starting position, a driving distance, a driving path, or a combination thereof.

12. The DTE prediction apparatus of claim 10, wherein the processor is further configured for storing driving history for a predetermined driving period as summary data, and to vectorize a driving start time.

13. The DTE prediction apparatus of claim 12, wherein the processor is further configured for:
generating clusters based on density and a minimum number of vectorized points, and
generating a cluster group using a density-based unsupervised clustering model.

14. The DTE prediction apparatus of claim 13, wherein the density-based unsupervised clustering model includes density-based spatial clustering of application with noise (DBSCAN).

15. The DTE prediction apparatus of claim 10, wherein the processor is further configured for generating a plurality of cluster groups by clustering driving time information and driving patterns including a closest distance to a median number of driving distances.

16. The DTE prediction apparatus of claim 15, wherein the processor is further configured for:
selecting a median number of each of the cluster groups as a center point, and
selecting a cluster group including a center point of a closest distance to a current driving feature vector of the vehicle among the center points of the respective cluster groups.

17. The DTE prediction apparatus of claim 16, wherein the processor is further configured for:
reading a driving pattern and driving information of the selected cluster group from the storage, and
correcting the DTE predicted by the DTE prediction model by use of the driving pattern and the driving information of the selected cluster group.

18. The DTE prediction apparatus of claim 15, wherein the processor is further configured for selecting a cluster group including a high cosine similarity between a current driving feature vector of the vehicle and driving time and day data from among the cluster groups, and to correct the DTE predicted by the DTE prediction model using the driving pattern and the driving information of the selected cluster group.

19. The DTE prediction apparatus of claim 18, wherein the processor is further configured for:
determining and correcting the DTE based on driving information including each road type section of a driving trajectory, a speed for each section, a pedal value for each section, a brake value for each section, an SOC value and a mileage, and a remaining SOC value, and
correcting the determined DTE using the driving pattern and the driving information of the selected cluster group.

20. A DTE prediction method comprising:
defining, by a processor, a distance to empty (DTE) prediction model of a vehicle based on a linear regression model reflecting a Bayesian probability distribution;
learning, by the processor, the DTE prediction model based on driving data of the vehicle;
predicting, by the processor, the DTE; and
providing the predicted DTE to a user,
wherein the DTE prediction method further includes:
defining, by the processor, the linear regression model reflecting an initial Bayesian probability distribution as a prior probability model;
generating, by the processor, a posterior probability model based on additionally collected driving data of the vehicle and the prior probability model; and
controlling the vehicle to follow the DTE prediction model.

* * * * *